(12) United States Patent
Cambonie

(10) Patent No.: US 8,799,623 B2
(45) Date of Patent: Aug. 5, 2014

(54) HIERARCHICAL RECONFIGURABLE COMPUTER ARCHITECTURE

(75) Inventor: Joël Cambonie, La Combe de Lancey (FR)

(73) Assignee: STMicroelectronics S.A., Montrouge (FR)

( * ) Notice: Subject to any disclaimer, the term of this patent is extended or adjusted under 35 U.S.C. 154(b) by 1778 days.

(21) Appl. No.: 12/086,971

(22) PCT Filed: Dec. 22, 2006

(86) PCT No.: PCT/EP2006/070200
§ 371 (c)(1),
(2), (4) Date: Jan. 21, 2011

(87) PCT Pub. No.: WO2007/071795
PCT Pub. Date: Jun. 28, 2007

(65) Prior Publication Data
US 2011/0107337 A1      May 5, 2011

(30) Foreign Application Priority Data

Dec. 22, 2005   (EP) .................................... 05112850

(51) Int. Cl.
*G06F 15/80*   (2006.01)
*G06F 15/78*   (2006.01)
*G06F 15/173*  (2006.01)
G06F 9/38      (2006.01)
G06F 13/368    (2006.01)

(52) U.S. Cl.
CPC .......... *G06F 15/803* (2013.01); *G06F 15/7867* (2013.01); *G06F 9/3885* (2013.01); *G06F 15/17381* (2013.01); *G06F 15/173* (2013.01); G06F 13/368 (2013.01)
USPC ......................................................... 712/15

(58) Field of Classification Search
CPC ........................... G06F 15/803; G06F 15/7867
See application file for complete search history.

(56) References Cited

U.S. PATENT DOCUMENTS 5,850,537 A     12/1998  Selvidge et al.
5,924,119 A *    7/1999  Sindhu et al. ................. 711/141

(Continued)

OTHER PUBLICATIONS

International Search Report from corresponding International Application No. PCT/EP2006/070200 filed Dec. 22, 2006, search report completed on Apr. 5, 2007.

(Continued)

*Primary Examiner* — Eric Coleman
(74) *Attorney, Agent, or Firm* — Wolf, Greenfield & Sacks, P.C.

(57) ABSTRACT

A reconfigurable hierarchical computer architecture having N levels, where N is an integer value greater than one, wherein said N levels include a first level including a first computation block including a first data input, a first data output and a plurality of computing nodes interconnected by a first connecting mechanism, each computing node including an input port, a functional unit and an output port, the first connecting mechanism capable of connecting each output port to the input port of each other computing node; and a second level including a second computation block including a second data input, a second data output and a plurality of the first computation blocks interconnected by a second connecting means for selectively connecting the first data output of each of the first computation blocks and the second data input to each of the first data inputs and for selectively connecting each of the first data outputs to the second data output.

31 Claims, 7 Drawing Sheets

(56) References Cited

U.S. PATENT DOCUMENTS

| | | | |
|---|---|---|---|
| 6,760,744 B1* | 7/2004 | Halaas et al. | 709/201 |
| 7,069,392 B2* | 6/2006 | Kota et al. | 711/141 |
| 7,203,816 B2* | 4/2007 | Morimura et al. | 712/11 |
| 7,490,220 B2* | 2/2009 | Balasubramonian et al. | 712/32 |
| 2002/0075844 A1 | 6/2002 | Hagen | |
| 2002/0075870 A1* | 6/2002 | de Azevedo et al. | 370/390 |
| 2003/0028750 A1* | 2/2003 | Hogenauer | 712/10 |
| 2003/0040898 A1* | 2/2003 | McWilliams et al. | 703/21 |
| 2003/0154346 A1* | 8/2003 | Gruner et al. | 711/130 |
| 2005/0131997 A1 | 6/2005 | Lewis et al. | |
| 2005/0278680 A1* | 12/2005 | Mukherjee et al. | 716/16 |
| 2006/0015701 A1 | 1/2006 | Hogenauer | |

OTHER PUBLICATIONS

Yeung A.K.W. et al., A Reconfigurable Data-Driven Multiprocessor Architecture for Rapid Prototyping of High Throughput DSP Algorithms, System Sciences, 1993, Proceeding of the Twenty-Sixth Hawaii International Conference on Wailea, HI, Jan. 5-8, 1993, Los Alamitos, CA, IEEE, US, vol. 1.

Singh et al., "MorphoSys: An Integrated Reconfigurable System for Data-Parallel and Computation-Intensive Applications", IEEE Transactions on Computers, vol. 49, No. 5, May 2000, pp. 465-481.

Mei et al., "DRESC: A Retargetable Compiler for Coarse-Grained Reconfigurable Architectures", IEEE, 2000, pp. 166-173.

Lee et al., "Space-Time Scheduling of Instruction-Level Parallelism on a Raw Machine", International Conference on Architectural Support for Programming, pp. 46-57, 1998.

* cited by examiner

HIERARCHICAL RECONFIGURABLE COMPUTER ARCHITECTURE

BACKGROUND OF THE INVENTION

1. Field of the Invention

The present invention relates to a computer architecture and a method of mapping operations to the architecture. In particular the present invention relates to a hierarchical reconfigurable computer architecture.

2. Discussion of the Related Art

The complexity of digital electronic products is increasing rapidly, but at the same time electronic product producers wish to reduce the time to market of their products, and to lower costs. Much of the time associated with bringing a product to market is spent in validating and testing hardware implementations.

Reconfigurable architectures provide a means of reducing the time to market by allowing designers to postpone commitment to a certain design until after silicon fabrication. Furthermore, updated designs can be loaded during the lifetime of a device to perform new functionality not envisaged at the time of first marketing the product. FPGAs (Field Programmable Gate Arrays) are an example of a reconfigurable architecture that operates at bit level, and uses lookup tables, but is unable to meet high processing power requirements of modern designs. A new form of reconfigurable architecture has been proposed that is a coarse-grained architecture and comprises multiple processors, each operating at approximately word level, for example 12 or 16 bits, and producing one or more words at their output.

A number of coarse-grained architectures have been proposed. Technical paper titled "MorphoSys: An Integrated Reconfigurable System for Data-Parallel and Computation-Intensive Applications" (IEEE Transactions on Computers, vol. 49, No 5, May 2000) describes a model for a reconfigurable computing system, targeted at applications with inherent data-parallelism. The proposed architecture is a SIMD (Single Instruction Multiple Data) architecture. The architecture comprises an eight by eight reconfigurable cell comprising four blocks, each block comprising four by four cells. Within the reconfigurable cell array, cells may communicate directly with four nearest neighbors. Some degree of second level connectivity is provided at the inter quadrant level, wherein each cell can access the output of any other cell in its row or column. Inter quadrant express lanes provide further connectivity between cells in adjacent blocks allowing cells of a given row to output values to the cells of the same row in a different quadrant. Likewise, cells in a certain column may output data directly to cells in a same column of a different quadrant.

Each reconfigurable cell comprises two input multiplexers, an ALU (Arithmetic Logic Unit) and multiplier block, a shift register, an output register, and a register file, all controlled by a context register. The context register in each cell receives context words from a central context memory, these words containing the signals for controlling the cell hardware.

The MorphoSys system has a number of disadvantages. Due to the design of the hardware in each cell, scheduling of operations within the cells is hard to control. The SIMD architecture having a central context memory is not suitable for irregular algorithms such as those used for deblocking filters. The array structure of the reconfigurable cells as well as the column and row interconnections between the cells is limiting for some requirements, and also reduces the scalability of the hardware as linear enlargement or reduction in size of the hardware is difficult.

There is a need for an efficient method of mapping designs to a coarse-grained architecture. The MorphoSys paper does not discuss in detail methods for mapping operations onto the MorphoSys architecture. However, technical paper titled "DRESC: a Retargetable Compiler for Coarse-Grained Reconfigurable Architectures" discusses a compiling tool called DRESC (Dynamically Reconfigurable Embedded System Compiler), able to parse, analyze, transform, and schedule plain C source code to a family of compiler-friendly coarse-grained reconfigurable architectures. An architecture is proposed comprising an array of functional units and register files having nearest neighbor or column and row interconnectivity. The compiler itself comprises a Modulo Scheduling Algorithm stage that receives graphs representing both the program and the architecture, and then attempts to map the program graph to the architecture graph, and to perform scheduling to achieve optimal performance with respect to all dependencies.

A disadvantage of the DRESC compiler is that by performing mapping and scheduling as two separate steps the compiler is slow and inefficient. Furthermore, this compiler is not able to process large applications due to complexity levels that grow exponentially. When the complexity of the architecture increases, the execution time will explode and it may be impossible to find a satisfactory solution, or even any solution at all.

The technical paper titled "Space-Time Scheduling of Instruction-Level Parallelism on a Raw Machine" (International Conference on Architectural Support for Programming, P. 45-57), presents an alternative coarse-grained architecture and compiler. The architecture comprises an array of tiles, each comprising a five-stage pipeline, interconnected over a pipelined, point-to-point network. Each node in the array comprises a switch connected to its processor and its four neighbors. The compiler includes a data partitioning stage, a data and instruction placing stage, a communication code generating stage, and an event scheduling stage. Partitioning is performed to maximize instruction level parallelism.

The architecture of the RAW machine is not applicable to ASIC (Application Specific Integrated Circuit) designs as the application granularity is that of a workstation (multi task), each of the nodes in the RAW architecture being a full RISC (Reduced Instruction Set Computer) computer, and each being assigned a task. Thus the RAW machine is complex and demanding in resources, and not easily scaleable based on the tasks it is to perform. Furthermore, scheduling in RAW is dynamic, there being some asynchronism in the execution of the tasks, which also adds complexity. The compiler in RAW fails to tackle the problem of efficiently routing data within the network, but instead opts for a dynamic routing scheme in which no relevance is given to the distance between computers.

All of the architectures described above are further disadvantageous in that an increase in the number of processing nodes implies a significant increase in the distance between nodes, either due to increase in the number of switches that data needs to traverse in the RAW machine, or due to the limited row and column interconnects of the MorphoSys proposal. Longer connections use more energy, and these architectures do not provide an efficient structure for reducing the distance between nodes, and thus lack scalability.

SUMMARY OF THE INVENTION

Embodiments of the present invention aim to overcome some of the disadvantages discussed above.

According to a first aspect of the present invention there is provided a reconfigurable hierarchical computer architecture having N levels, where N is an integer value greater than one, wherein said N levels comprise a first level comprising a first computation block comprising a first data input, a first data output and a plurality of computing nodes interconnected by a first connecting means, each computing node comprising an input port, a functional unit and an output port, the first connecting means capable of connecting each output port to the input port of each other computing node and a second level comprising a second computation block comprising a second data input a second data output and a plurality of said first computation blocks interconnected by a second connecting means for connecting a selected one of said first data output of each of said first computation blocks and said second data input to each of said first data inputs and for connecting a selected one of said first data outputs to said second data output.

The reconfigurable computer architecture can further comprise (N−2) further levels, each nth level, where n is equal to each integer value from 3 to N, comprising an nth computation block comprising an nth data input an nth data output and a plurality of (n−1)th computation blocks each comprising an (n−1)th data input and an (n−1)th data output, said (n−1)th computation blocks interconnected by an nth connecting means for selectively connecting each (n−1)th data output and the nth data input to each (n−1)th data input, and for selectively connecting each (n−1)th data output to the nth data output.

According to a further aspect of the present invention there is provided a portable media device comprising at least one reconfigurable hierarchical computer architecture having N levels, where N is an integer value greater than one, wherein said N levels comprise a first level comprising a first computation block comprising a first data input, a first data output and a plurality of computing nodes interconnected by a first connecting means, each computing node comprising an input port, a functional unit and an output port, the first connecting means capable of connecting each output port to the input port of each other computing node, and a second level comprising a second computation block comprising a second data input a second data output, and a plurality of said first computation blocks interconnected by a second connecting means for selectively connecting said first data output of each of said first computation blocks and said second data input to each of said first data inputs and for selectively connecting each of said first data outputs to said second data output.

According to a further aspect of the present invention there is provided a method of mapping a required task onto the physical resources of a reconfigurable hierarchical computer architecture having N levels, where N is an integer value greater than one, a first level comprising a cluster comprising a plurality of interconnected computing nodes each comprising a functional unit, and a second level comprising an interconnected plurality of said clusters, said method comprising partitioning said task into subtasks each comprising a plurality of operations, assigning each of said subtasks to one of said clusters, assigning the operations of each subtask to the computing nodes in each cluster and scheduling the operations in the computing nodes and performing fine routing between computing nodes.

According to yet a further aspect of the present invention there is provided a reconfigurable hierarchical computer architecture having N levels, where N is an integer value greater than one, a first level comprising a cluster comprising a plurality of interconnected computing nodes, a second level comprising an interconnected plurality of said clusters, each computing node comprising a functional unit, an instruction memory and at least one input buffer.

The reconfigurable hierarchical computer architecture preferably further comprises an output port and selecting means for selectively connecting said output port directly to said at least one input buffer.

According to a further aspect of the present invention there is provided a portable media device comprising at least one reconfigurable hierarchical computer architecture having N levels, where N is an integer value greater than one, a first level comprising a cluster comprising a plurality of interconnected computing nodes, a second level comprising an interconnected plurality of said clusters, each computing node comprising a functional unit, an instruction memory and at least one input buffer.

According to yet a further aspect of the present invention there is provided a method of mapping a required task onto the physical resources of a hierarchical reconfigurable computer architecture having N levels, where N is an integer value greater than one, a first level comprising a cluster comprising a plurality of interconnected computing nodes, and a second level comprising a plurality of interconnected clusters, said method comprising determining that a new connection is required between a first computing node in a first cluster and a second computing node in a second cluster, determining whether a connection already exists between a third computing node in said first cluster and said second cluster and if said connection already exists, connecting said first computing node to said second computing node via said third computing node.

BRIEF DESCRIPTION OF THE DRAWINGS

The aims, characteristics and advantages, as well as other aspects of the present invention, will be described in detail in the following description with reference to a number of examples, and with reference to the attached figures in which.

For clarity, throughout the figures, like features have been referenced using the same reference numerals.

DETAILED DESCRIPTION

Figure 1:
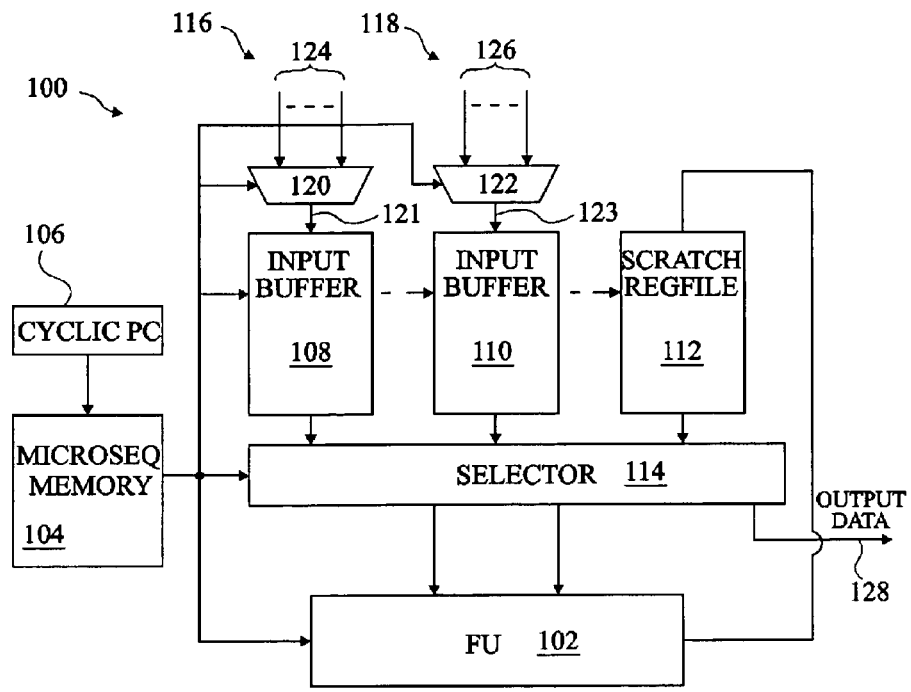
FIG. 1 illustrates schematically a computing node according to an embodiment of the present invention.

FIG. 1 illustrates a computing node (CN) 100. CN 100 comprises a functional unit 102, which is for example an arithmetic logic unit (ALU), and is capable of performing an operation on one or more inputs and providing an output. The operation performed by the functional unit 102 is controlled by a microsequence memory 104 connected to the functional unit, which stores instructions to be executed sequentially. A cyclic program count (PC) 106 is connected to the microsequence memory. First and second input buffers 108 and 110 and a scratch register file 112 provide inputs to the functional unit 102. Input buffers 108 and 110 each store for example 16 bits of data (one word), whilst the scratch register file 112 stores for example 64 bits of data (four words). The output of a functional unit is connected to the scratch register file 112, such that the output of the functional unit 102 may be selected for input to the functional unit 102 on a subsequent cycle. The output of each input buffer 108 and 110 and of the scratch register file 112 is connected to a selector 114 which selects two of these outputs to be provided to functional unit 102. In alternative embodiments, selector 114 could select up to three values for input to functional unit 102.

First and second input ports 116, 118 are provided, associated with each input buffer 108, 110 respectively. Each input port respectively comprises a first and second multiplexer 120, 122 connected to the first and second input buffers by lines 121 and 123 respectively. First multiplexer 120 comprises a number of data inputs 124 and a control input, and second multiplexer 122 comprises a number of data input 126, and a control input. The microsequence memory block 104 is connected to the control input of each multiplexer 120, 122 for controlling which of the inputs of each is selected to be written to the respective input buffer 108, 110.

An output of the computer node 100 is provided on line 128 from selector 114. This output is taken from one of the input buffers 108, 110 or from the scratch register file 112, and is selected by selector 114 under control of the microsequence memory 104.

In an alternative embodiment, the first and second input buffers 108, 110, and the scratch register file 112 are combined as a single register bank in which all the registers are identical. Such a combined register bank still comprises inputs from each of the input ports 116, 118 and from the functional unit 102, and a plurality of outputs to selector 114. For example the combined register bank is a FIFO buffer comprising 16 registers, each register being configurable to receive data from input ports 116 or 118, or output of functional unit 102. A first group of registers, for example 4 registers, are configured as belonging to a first FIFO (first in first out) area that receives inputs from input port 116, a second group of registers, for example 4 registers, are configured as belonging to a second FIFO area that receives inputs from input port 118, and the remaining registers are configured as temporary registers, storing intermediate results or output values received from functional unit 102. Configuration of the combined register bank is for example controlled by the microsequence memory 104.

The advantage of a single combined register bank in each computing node 100 is that it is adaptable according to requirements, avoiding wasted registers. A further advantage of this embodiment for a hierarchical computing structure is that initially registers can be configured to receive data values from the input buffers, and are thus used as data stores. Once this data has been consumed, for example provided to the functional unit 102 via the selector 114, these registers can be configured as temporary registers. This is possible as the registers are part of the same register bank.

In the embodiment of FIG. 1, the functional unit 102 operates at word level, and therefore the data inputs on lines 124 and 126 are each 16 bits wide, functional unit 102 operates at 16 bits and the data output on line 128 is also 16 bits wide.

A reconfigurable computer architecture comprises a plurality of computing nodes 100 hierarchically interconnected at a number of levels. The first level comprises a cluster comprising a number of interconnected CNs 100.

Figure 2:
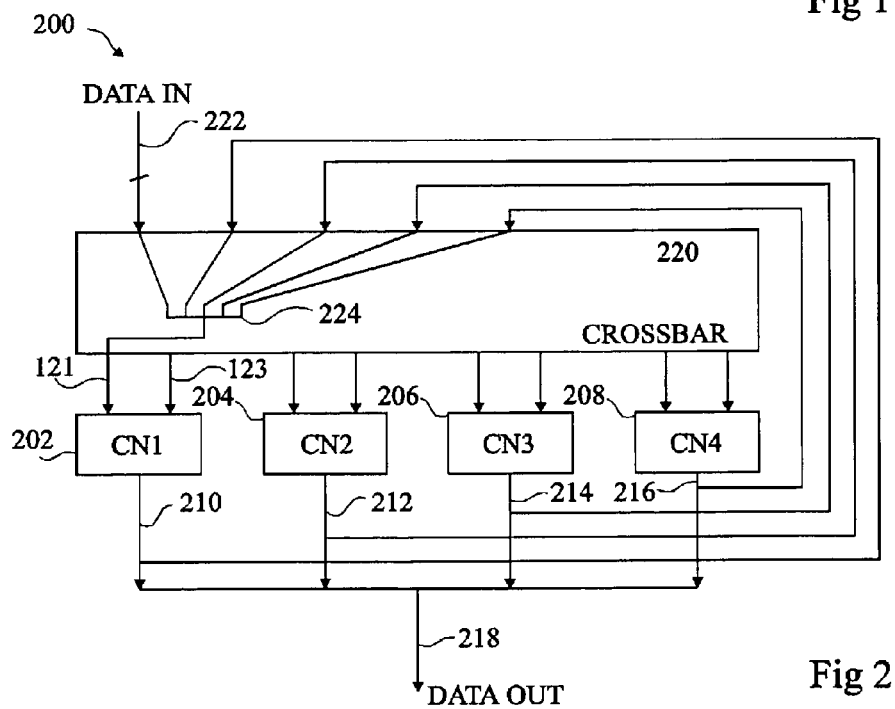
FIG. 2 illustrates schematically a cluster comprising four computing nodes of FIG. 1 interconnected according to an embodiment of the present invention.

FIG. 2 illustrates a cluster 200 comprising four computing nodes 202, 204, 206 and 208, each comprising the structure described in FIG. 1, however without the input multiplexers 120, 122 which are provided by a crossbar 220 in this embodiment. The output of each CN, labelled 210, 212, 214 and 216 respectively, is provided on output lines 218 of the cluster. Given that each CN output is one word wide, this cluster output 218 will be four words wide. The output of each of the CNs is also connected to a crossbar 220.

Crossbar 220 also receives a data input on input lines 222, which comprises a number of data signals originating from other clusters, and is received via a multiplexing interconnection that will be described in more detail below. In the embodiment of FIG. 2 crossbar 220 provides the function of each of the input multiplexers 120, 122 of each CN 202 to 208, and selectively connects the outputs from the computing nodes on lines 210, 212, 214 and 216 and all of the data inputs on lines 222 to each of the buffer input lines 121 and 123 to the input buffer 108, 110 of each of the computing nodes 202 to 208. For example, as shown in FIG. 2, the data input lines on line 222 and the output from each CN on lines 210 to 216 are provided to an input multiplexer 224 of the crossbar 220 associated with the first input port 116 of the first CN 202 which performs the same function as input multiplexer 120 shown in FIG. 1. Multiplexer 224 is controlled by the microsequence memory 104 of CN 202 by a control line not shown in FIG. 2. The output of input multiplexer 224 is provided to the input lines 121, which are connected to the first input buffer 108 of CN 202. The crossbar 220 provides similar connections to each of the first and second input buffers 108, 110 of the first, second, third and fourth CNs. In the example of FIG. 2 a connection has been shown between the output of CN 202 and its first input port. However, this connection is not necessary as this connection is already provided by the scratch register file 112.

Thus the interconnections between computing nodes within a cluster are provided by input multiplexers 120, 122, or by crossbar 220, both of which are controlled by the microsequence memory, allowing these connections to be dynamically controlled, and time multiplexed during operation of the cluster, for example while executing instructions.

Figure 3:
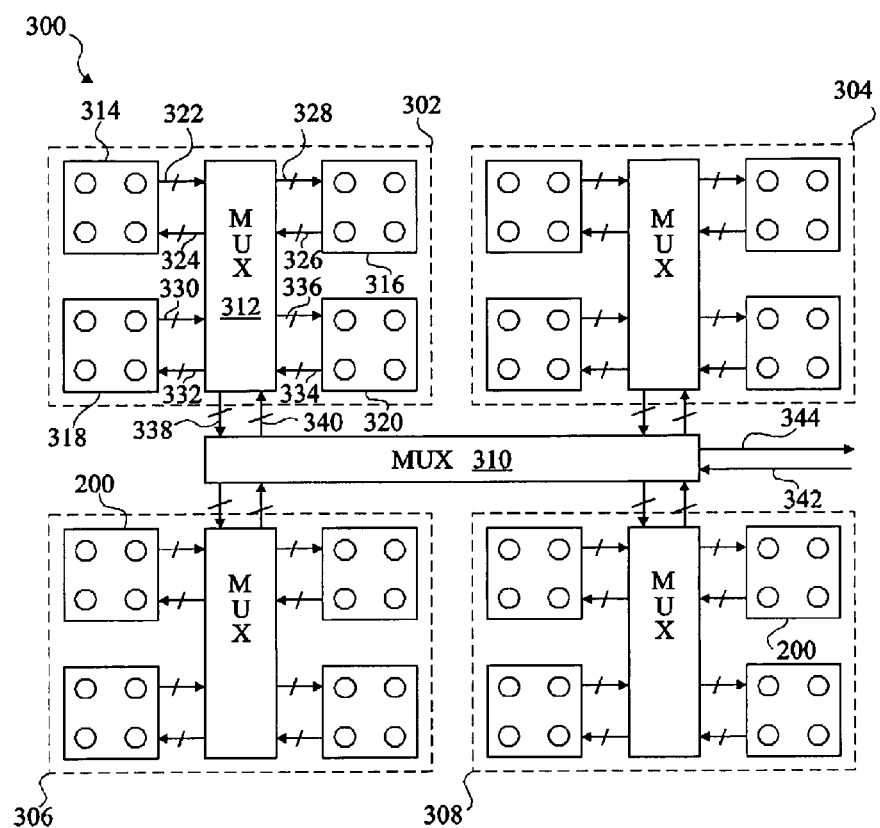
FIG. 3 illustrates schematically a computing block comprising four sub-blocks, each comprising four clusters interconnected according to an embodiment of the present invention.

FIG. 3 illustrates a computing block 300 comprising four sub-blocks 302, 304, 306 and 308. These sub-blocks are interconnected by a multiplexing block 310. Each sub-block is identical, and comprises a multiplexing block interconnecting four clusters. As shown in the case of sub-block 302, a multiplexing block 312 interconnects four clusters 314, 316, 318 and 320. Cluster 314 is connected by a cluster output line 322 and a cluster input line 324 to the multiplexing block 312. Likewise, clusters 316, 318 and 320 are connected by cluster output lines 326, 330 and 334 respectively, and by cluster input lines 328, 332 and 336 respectively, to multiplexing block 312. Each of the cluster output lines 322, 326, 330 and 334 comprise the outputs from the four computing nodes of the respective cluster, and are thus four words wide. Each of the cluster input lines 324, 328, 332 and 336 comprises a number of input words, the number of which will depend on the system requirements. Multiplexing block 312 allows any of the cluster output lines to be connected to any of the cluster input lines or to a sub-block output line 338. A sub-block input line 340 may also be connected to any of the cluster input lines. The sub-block output and input lines 338 and 340 allow the sub-block to be connected to the input and output lines from the other sub-blocks 304,306 or 308 via multiplexing block 310.

Multiplexing block 310 of computing block 300 comprises an input line 342 and an output line 344, which provide inputs and outputs of computing block 300 to the next level up in the hierarchical architecture. Input line 342 and output line 344 may be connected to the sub-block input or output lines respectively of any of the sub-blocks 302 to 308.

FIG. 3 illustrates the first, second and third levels in the hierarchical architecture. The first level is the cluster level comprising four CNs interconnected by the crossbar, for example clusters 314, 316, 318 and 320. The second level is the sub-block level, each sub-block 302, 304, 306 and 308 comprising four clusters selectably interconnected by a multiplexing block, for example multiplexing block 312. The third level is a computing block level, and comprises four sub-blocks selectably interconnected by multiplexing block 310. The interconnections of the CNs in a cluster provide a low cost connectivity, signals being selected by crossbar 220 or multiplexers 120, 122, which are dynamically controlled, in this example by the microsequence memory of the computing nodes. This means that these connections can be changed during execution of instructions in the instruction memory, and thus programming a computer node to be connected to another computer node in the same cluster demands relatively low resources. The selectable connections at the higher levels are higher cost connections as each higher level adds a further level of hardware, and these connections are statically programmed, such that they are not reprogrammed during execution of a particular instruction sequence, but can be reprogrammed during a boot phase of the computer, to allow the architecture to perform a different function. These static connections have the advantage of quickly linking computing nodes that would be very distant in a 2-dimensional array with only nearest neighbour connectivity, without requiring the added hardware, processing means or connections that would be required for dynamic connections, such as those provided within a cluster.

Although not shown in FIG. 3, a hierarchical architecture can comprise many higher levels. In the current example each level will comprise four blocks of the level below, interconnected by a multiplexing block similar to multiplexing block 310. For example, at the next level up from that shown in FIG. 3, four computing blocks 300 are interconnected by a multiplexing block.

Figure 4:
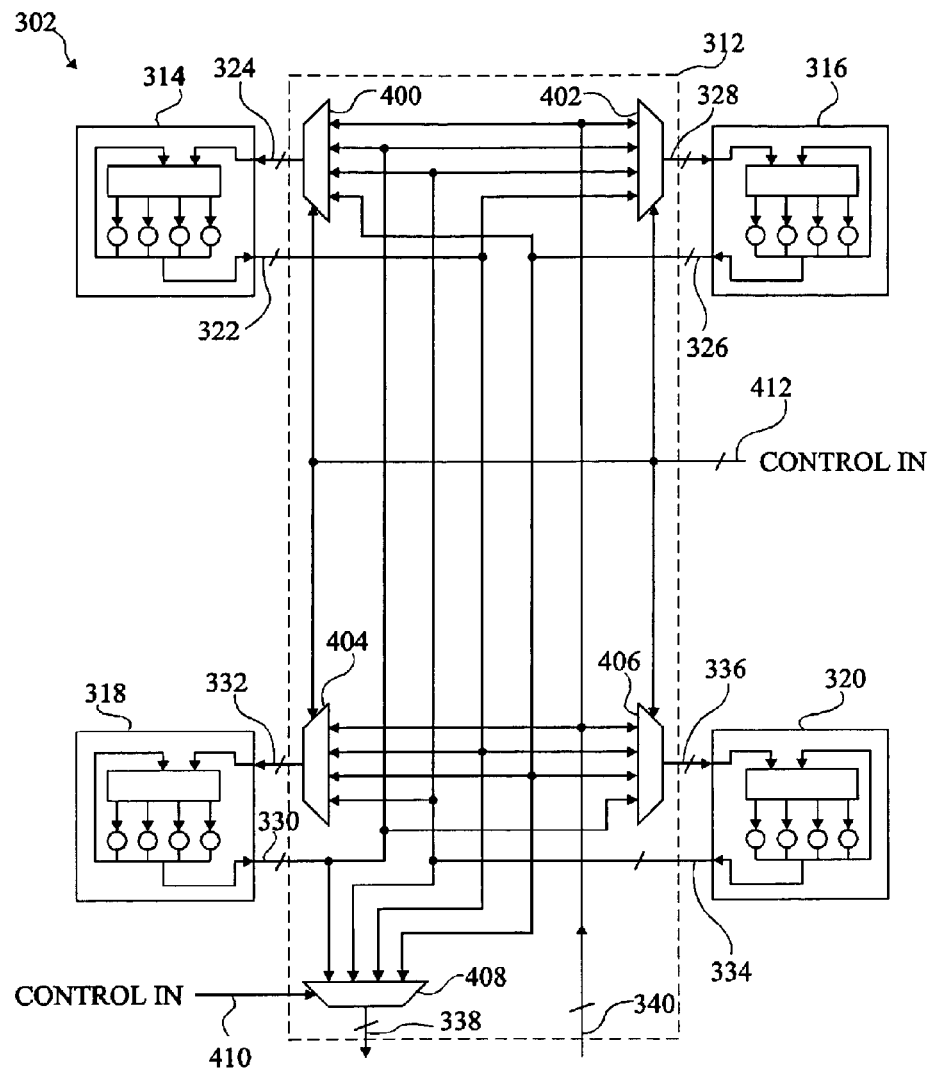
FIG. 4 illustrates schematically one of the sub-blocks of FIG. 3 in more detail.

FIG. 4 illustrates sub-block 302 in more detail. Multiplexing block 312 comprises first, second, third and fourth multiplexers labelled 400, 402, 404 and 406 respectively. The outputs from these multiplexers are connected to the clusters 314, 316, 318 and 320 respectively. For example, the output of multiplexer 400 is connected to cluster 314 by a cluster input line 324. Each of the multiplexers 400 to 406 comprises four data inputs and one control input. One data input to each multiplexer is connected to line 340, which is the data input line connecting sub-block 302 to the next level of the hierarchy, for example to one of the other computation blocks 304, 306 or 308 via multiplexing block 310.

The cluster output lines 322, 326, 320 and 334 are each connected to an input of the multiplexer 400, 402, 404 or 406 associated with each other cluster. It is not necessary for a cluster output to be connected to its own input as this connection is provided by crossbar 220 within each cluster. For example, cluster output line 322 of cluster 314 is connected to an input of multiplexer 402, multiplexer 404, and multiplexer 406. In this way, output data from any cluster can be provided as an input to any of the other cluster blocks. The output from each cluster 314, 316, 318 and 320 is also connected to an input of an output multiplexer 408, the output of which provides the output of a sub-block 302 on line 338. A control input line 410 is connected to a control input of multiplexer 408 and an input control line 412 is connected to each of the first, second, third and fourth multiplexers. These control lines control which of the inputs of multiplexers is selected for output. Generation of this control signal will be described in more detail herein after.

Figure 5:
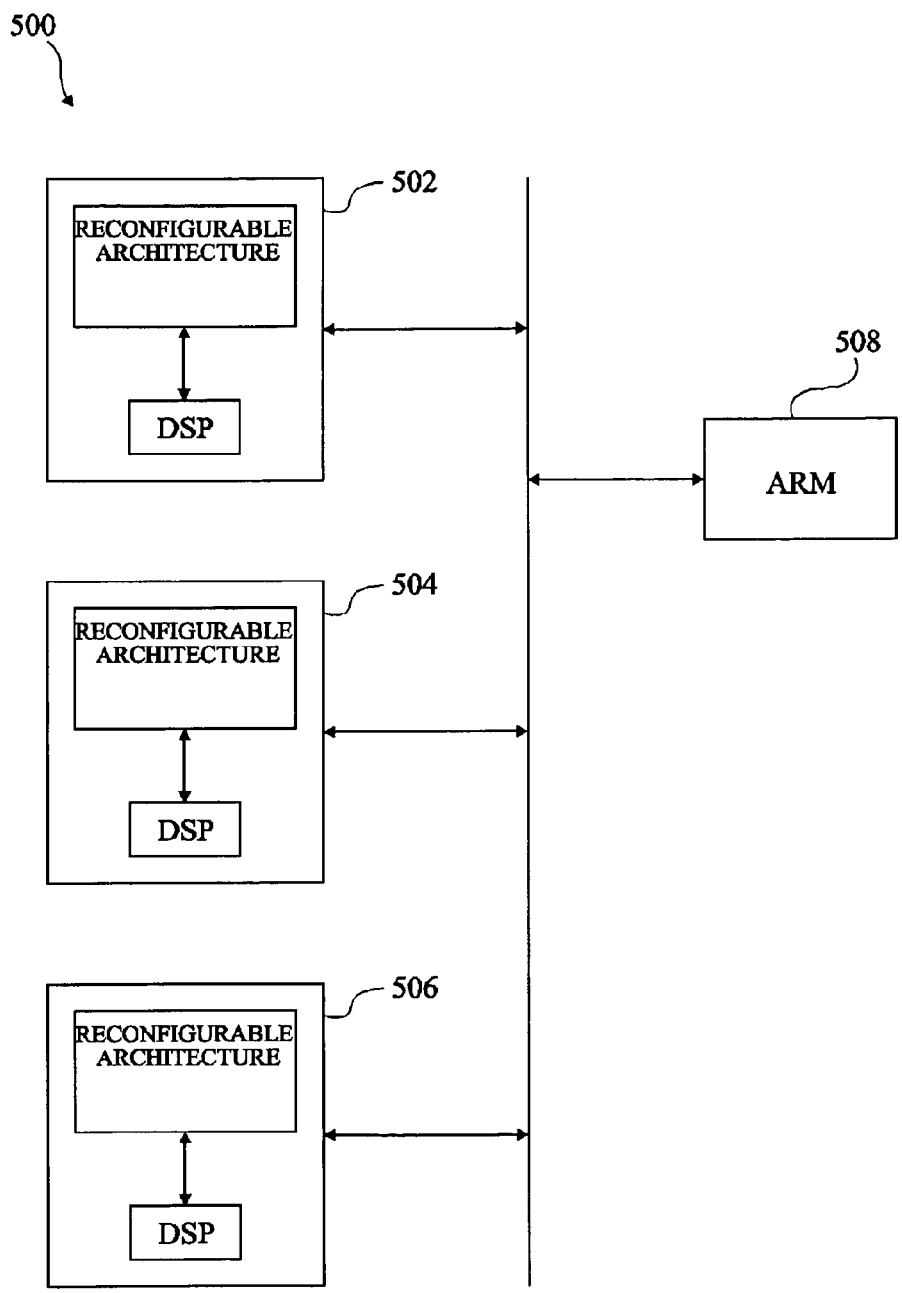
FIG. 5 illustrates a computing station 500 comprising a number of reconfigurable architectures according to an embodiment of the present invention.

FIG. 5 illustrates a computing station 500 comprising three computing units 502, 504 and 506 each comprising a reconfigurable architecture as described above. Each reconfigurable architecture comprises a number of levels N, N being an integer number. The number of levels required will depend on the type and complexity of the task to be performed.

The computing station 500 is, for example, a portable media device, capable of a variety of functions, such as playing video streams, allowing voice communication, providing internet connectivity, etc. The portable media device could be principally a mobile telephone, having some of the above additional functionality, or alternatively, the media device could be principally a PDA (personal digital assistant), a laptop computer, a digital camera, a games console, or the like.

The architecture described so far in relation to the figures is a radix 4 architecture, meaning that it grows in multiples of four, each level comprising four groups of the previous level. Radix 4 provides a good compromise between low complexity at each level and fewer levels meaning less distance between nodes. However, a radix r architecture is possible wherein r is an integer greater than one. Furthermore, levels within an architecture can vary in size without respecting the radix r model, allowing the size of the architecture to be more finely tuned and to be increased linearly. For example, at the highest level in a generally radix 4 architecture, only two blocks of the level below could be interconnected, thus doubling the size of the architecture compared to the previous level, rather than quadrupling it. It should also be noted that as the present architecture is expanded, processing power of the system increases proportionally, and there is no significant decline in the interconnectivity of computing nodes.

Referring again to FIG. 5, a digital signal processor (DSP) controls each reconfigurable architecture, and is responsible for programming the architecture for a required use as will be explained below. Preferably each architecture is assigned a specific task to perform, for example performing the DCT (discrete cosine transform) step in an MPEG encoder. A core processor, for example an ARM (advanced RISC (reduced instruction set computer) machine) 508 is provided with associated cache memory (not shown) for controlling assignment of tasks, and ARM 508 is connected to each computing unit 502 to 506 via a bus.

Operation of the circuitry of FIGS. 1 to 5 will now be described.

A mapping process, which will be described in detail below, is performed to map a required task onto a hierarchical architecture. This will define the required interconnections between clusters and computing blocks within the architecture, as well as the micro-sequence instructions for each CN of the architecture. The architecture is preferably of approximately the correct size for a given task to avoid inefficient use of the available processing power.

During a boot phase, the micro-sequence memory 104 in each CN 100 is loaded by the DSP associated with the architecture, and includes instructions for controlling the hardware within each CN. Each instruction preferably contains one or more of the following:

Push (sequential write)—this indicates for each input port 116, 118, when data must be pushed into the corresponding input buffer 108, 110, and which of the input lines of the crossbar 220 should be selected for loading data into the input buffers via buffer input lines 121 and 123;

ALU Register Input Selection—provides the register addresses of the input buffers 108, 110 or the register file 112 for the read data of the current instruction, used for controlling selector 114;

ALU Register Output Selection—provides the register address in the scratch register file 112 for write back;

ALU Operation Code—defines the operation to be performed by the functional unit 102; and POP (register output selection)—defines the register addresses of the input buffers 108, 110 or the register file 112 from which data is to be taken for output at the data output on line 128.

Thus the transfer of instructions from one computing node to another is provided by the simple 'PUSH' and 'POP' fields, which are fields of an instruction, and not entire instructions themselves.

During the boot phase, the input buffers 108, 110 and the register file 112 are also configured, the PC 106 is reset, and the maximum count of the PC is programmed. As instructions in the microsequence memory 104 are executed, the PC 106 is incremented. The same sequence of code is cyclically executed with new sets of data coming from the input ports of the register file 112.

As well as loading instruction sequences into the micro-sequence memory 104, the DSP associated with the architecture also programs interconnections between the clusters 200 in the architecture for all levels, during the boot phase. These intercluster connections are static connections, and are thus programmed for example only once during the boot phase, and are then not reprogrammed during operation of the architecture. Programming these connections requires the generation of control signals to each of the multiplexing blocks in the architecture, for example to multiplexing blocks 312 shown in FIG. 3 that interconnect clusters, multiplexing blocks 310 that interconnect the next level and multiplexing blocks of higher levels. The micro-sequence memory 104 is also programmed such that crossbar 220 or multiplexers 120, 122 will be controlled during operation to select the correct input to each of the input buffers at the correct time. The computing nodes 100 within the architecture are then able to run synchronously and in parallel with each other, with data being transferred between computing nodes. For this, each computing node for example receives a common clock signal, used to time the transfer of data between computing nodes and the execution of instructions by the functional unit in each computing node.

In order to program the required instructions and hardware interconnections of the architecture described above, a mapping procedure is required.

Figure 6:
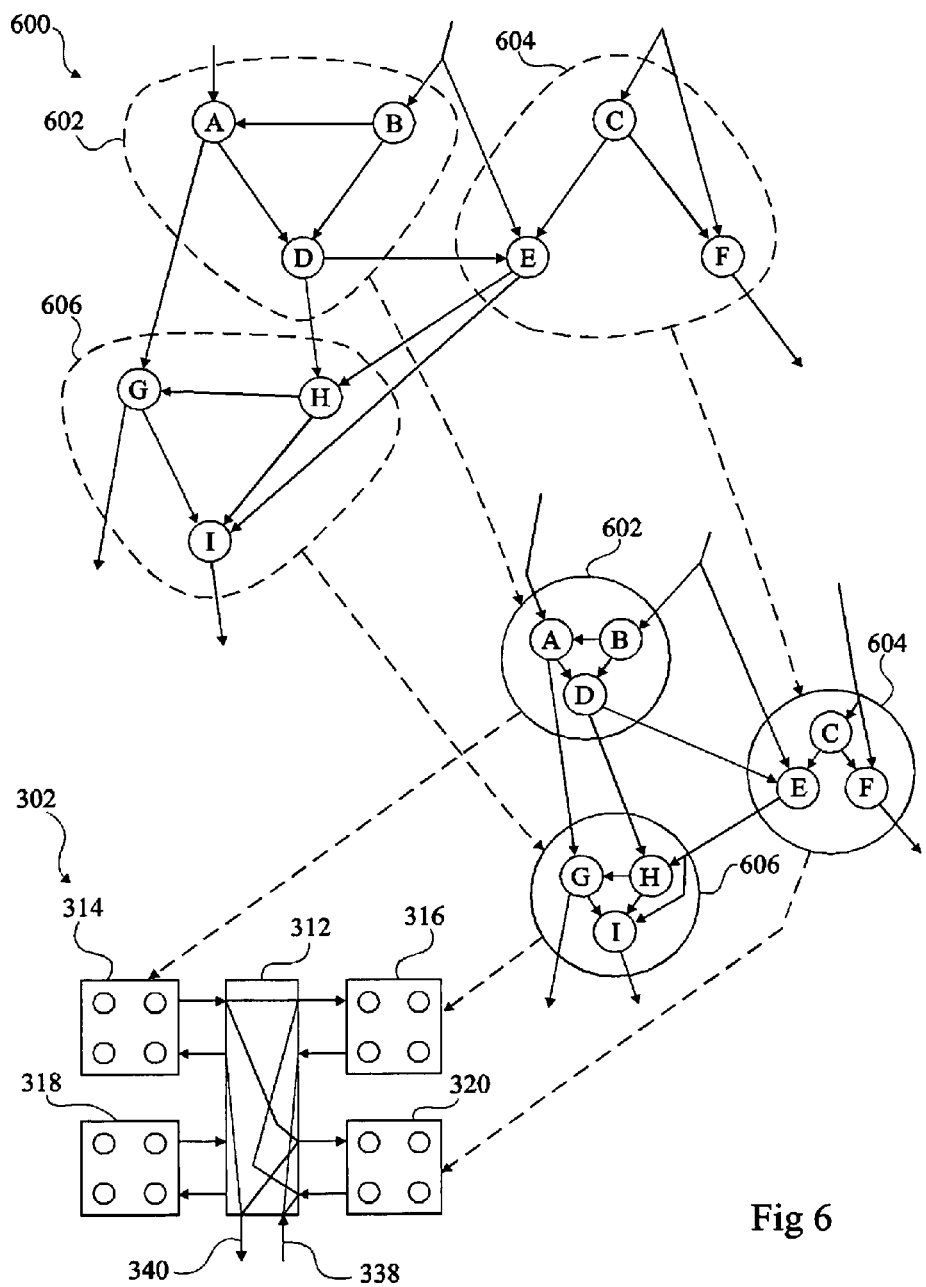
FIG. 6 illustrates steps in mapping a data flow graph to interconnected clusters according to an embodiment of the present invention.

FIG. 6 illustrates a first step in such a mapping procedure. As shown in FIG. 6, a required task is represented in the form of a data flow graph (DFG) 600. Such a graph can be constructed from a code representation of the program. Data flow graph 600 comprises a number of nodes A to I, each node representing an operation to be performed by the functional unit (102) of one of the computing nodes. For example, node A comprises a multiplication of its two inputs, wherein the output is provided to nodes G and D. A first step in mapping the functions illustrated in this data flow graph 600 to the hierarchical architecture is to divide the nodes into groups wherein the interconnection between these groups is reduced, and each group is executable by a cluster 200 of the hierarchical architecture. For example, the DFG 600 is divided into a first group 602, a second group 604 and a third group 606. The first group comprises nodes A, B and D, the second group comprises nodes C, E and F, and the third group comprises nodes G, H and I.

Once this basic grouping has been formed, the required task has been effectively divided into subtasks, and each of the subtasks is of a size operable by one of the clusters of the hierarchical architecture. Each of the subtasks is then assigned to a cluster in the architecture, for example, subtask 602 being assigned to cluster 314 from computing block 302, subtask 604 being assigned to cluster 320 and subtask 606 being assigned to cluster 316.

Once subtasks have been assigned to clusters, the routing between cluster blocks can be determined. This is intercluster routing, and as shown in FIG. 6, each of the connection lines from one group of subtasks to another group of subtasks translates to a physical connection between one cluster and another cluster. For example, the output of cluster 314 is connected to the input of cluster 320, which provides the connection between node D and node E of the data flow graph. Although in the data flow graph there are two connections between subtask group 606 from node E to subtask group 606, nodes H and I, these connections can be reduced to one connection between clusters, as the data is the same and can be split and provided to both computing nodes once it has arrived at cluster 316.

If routing has been successful between clusters, intracluster routing and scheduling can then be performed. This involves assigning each of the operations of the nodes of the data flow graph to a CN 100 in the hierarchical architecture. The interconnections between such computing nodes within a same cluster are low cost connections as the connection is easily implemented by the crossbar 220. Connections between CNs of different clusters are also assigned to the connections created during the intercluster routing. At the same time as intracluster routing is performed, scheduling of the operations is also performed. This involves assigning to each operation a time slot.

Figure 7A:
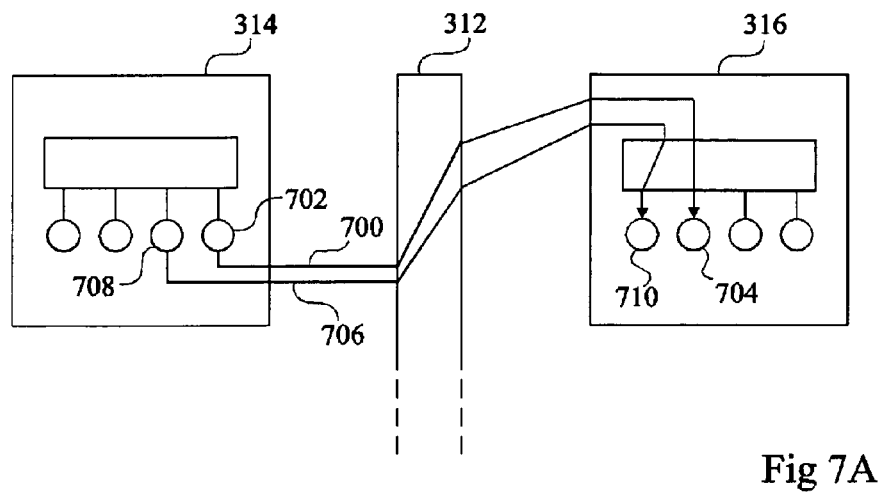
FIGS. 7A and 7B illustrate schematically alternative cluster interconnections according to an embodiment of the present invention.
Figure 7B:
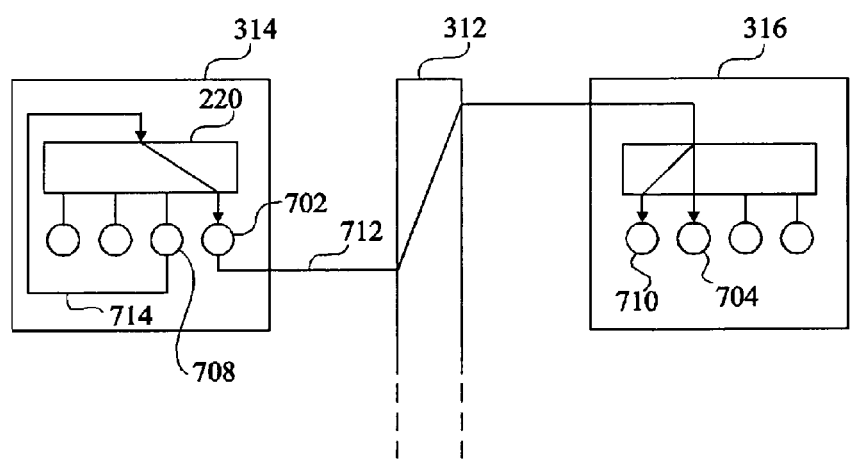

FIGS. 7A and 7B illustrate a way in which intercluster routing can be reduced during the intracluster fine routing phase. It is desirable to reduce intercluster connections as these are relatively high cost connections in terms of hardware use. As shown in FIG. 7A, it is possible that two connections would be required between two clusters. For example a first connection 700 may be required between a first CN 702 of cluster 314 and a first CN 704 of cluster 316. A second connection 706 may be required between a second CN 708 of cluster 314 and a second CN 710 of cluster 316. These two connections will require the use of two input pins of the multiplexer associated with cluster 316.

FIG. 7B illustrates a preferred embodiment in which hopping is used, wherein the two connections 700 and 706 are replaced by single connection 712 between the first CN 702 and cluster 316, thus reducing the number of input pins to cluster 316. The second CN 714 of cluster 314 is also connected to cluster 316 but in this example it is connected via the first CN 702. For this the low cost intracluster connection 714 is used between the second CN 714, via the cross bar 220 to the first CN 702. At the first CN 702, the data from CN 708 is stored in one of the input buffers 108, 110 of CN 702, and due to the direct connection from the input buffers to the data output line 128 via selector 114 in each computing node, the data can be output directly on line 128, without passing through the functional unit 102 of CN 702. The data then follows the established connection 700 to cluster 316.

There is a one clock cycle penalty in sending the two signals on the same connection, the signal from the second CN 708 being transmitted one cycle later. At cluster 316, line 712 is connected to both first and second CNs 704, 710 and the required signals can be selected appropriately by the multiplexers associated with each of these computing nodes.

Figure 8:
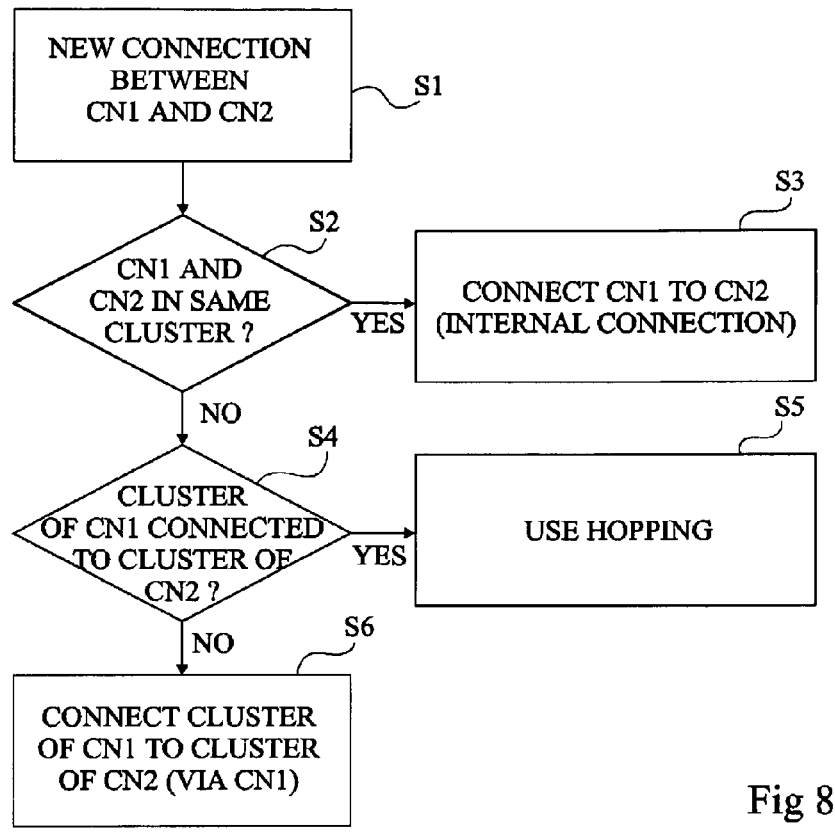
FIG. 8 is a flow diagram illustrating the method of forming interconnections between computing nodes of different clusters according to an embodiment of the present invention.

FIG. 8 shows a flow chart illustrating the general steps in reducing intercluster connections described above. As shown in FIG. 8, in a first step S1 it is determined that a new connection between a first computing node CN1 and a second computing node CN2 is required.

In step S2, it is determined whether the first and second computing nodes are in the same cluster. If the response is positive, the connection between these computing nodes can be performed by the crossbar 220 within the cluster, as shown in step S3. If the computing nodes are not within the same cluster, we proceed to step S4.

In step S4, it is determined whether or not the cluster associated with computing node 1 is connected to the cluster associated with computing node 2. If they are connected, as shown in step S5, hopping can be used. Hopping implies that the connection that already exists is used to connect computing node 1 to computing node 2, computing node 1 being connected to the computing node of the connection via the crossbar. If no connection already exists, we proceed to step S6.

In step S6, a connection between CN1 and CN2 is established between the clusters, via CN1. Any further connection required between the cluster of CN1 and the cluster of CN2 can also be routed via this connection.

Figure 9:
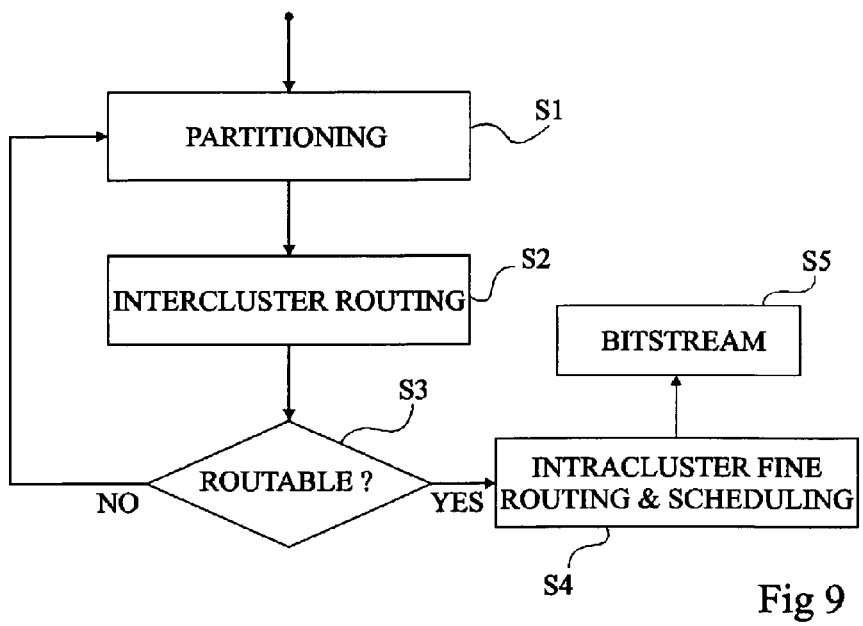
FIG. 9 is a flow diagram illustrating steps in mapping a required task onto a hierarchical computer architecture according to an embodiment of the present invention.

FIG. 9 is a flow diagram illustrating the steps in mapping and scheduling a task onto the hierarchical architecture described herein. It is assumed that the required task has been divided into individual operations and represented in the form of a data flow graph as shown in the example of FIG. 6.

In a first step S1, partitioning of the task is performed. This involves grouping the operations of task into subtasks that reduce interconnections between these subtasks. This is in order to reduce the number of connections between clusters when these subtasks are mapped to clusters. Preferably subtasks should comprise an equal number of nodes of the DFG, and therefore an equal number of operations, and each subtask should be executable by a cluster. The number of operations in each subtask will depend to some extent on the number of computing nodes in each cluster.

Next, in step S2, each of the subtasks is mapped to a cluster in the hierarchical architecture using a coarse place and route phase. This is preferably performed such that groups requiring more interconnections are located within the same cluster or at least a lower level computing block, such that connections between higher level computing blocks, which will be more costly, are reduced. The routing between the clusters is then determined.

In step S3, it is determined whether intercluster routing has been successful, and in particular whether the capacity of the interconnection network has been exceeded. If routing has not been successful, it is possible that congestion occurred, and therefore it may be necessary to increase the number of clusters, and restart partitioning step S1. If routing has been successful, we proceed to step S4.

As shown in step S4, intracluster fine routing and scheduling is then performed, preferably at the same time. Routes between clusters have already been determined in step S2, but this step involves connecting the output of particular CNs to these intercluster routes, or to the inputs of other CNs within the same cluster via crossbar 220. During this phase, each node or operation is assigned to one of the computing nodes within each cluster, and instruction scheduling is performed, by updating a reservation table associated with each functional unit. Scheduling is performed with respect to a circuit clock, which determines time slots in which data transfers may take place. Thus the schedule of each operation executed in a cluster is known with respect to the circuit clock. This means that time slots can be assigned to data transfers without a risk of a collision occurring on a link. There will be a flow of data edges through the computing nodes of each cluster, and time slots are assigned for transmission of each edge. The input and output ports of each CN has an input and output reservation table respectively associated with it which determines the transfer to be performed at each timeslot.

The following procedure can be implemented to perform step S4. The procedure involves, while nodes are still to be mapped, for each node, for each candidate CN in the cluster to which the node belongs and for each incoming data edge, determining a space time route. The candidate CNs are any CN of a particular cluster to which an operation could be assigned.

To determine a space time route, if the computing node at the source of the incoming data edge is in the same cluster as the destination computing node of the data edge, a common empty time slot in the output reservation table of the output port of the source CN and in the input reservation table of the input port of the destination CN is searched for and found. If such a time slot exists, a physical connection between the CNs is possible via the crossbar 220 of the cluster. If no such time slot exists for all candidates, this causes congestion in the system and either partitioning is restarted using more clusters, or more time slots are provided, for example by increasing the cycle time for computation.

If the source CN and the destination CN are not in the same cluster, then it is determined whether or not hopping can be used, as described above, i.e. whether or not a physical connection between computing nodes in each cluster already exists. If so, a common empty time slot is found in the output reservation tables of the source CN and the input reservation table of the CN to be used for the hop (CNhop), and then in the input and output reservation tables of the CNhop and the destination CN respectively. The crossbar 220 in the destination cluster is controlled by the destination CN such that the input corresponding to the physical connection is selected to be provided to an input buffer of that CN. If no physical connection exists, a time slot is found between the source CN and the destination CN, and this source CN can be used as the hub for further connections to that destination cluster by hopping.

Once a space time route has been determined for each incoming edge, the earliest available slot is determined for each candidate CN, and the candidate CN with the earliest available time slot is selected. However, if this time is later than tlate, scheduling is postponed for this node. Tlate is a known parameter representing the latest execution time that meets the critical path of the DFG. If the available time slot is later than this value, the critical path is extended. Otherwise the reservation tables for the input and output ports and for the functional unit are updated, and the physical routing of the data edges between computing nodes is implemented, which may be intercluster or intracluster connections.

Finally, in step S5, routing information and the microsequence instructions are generated in a binary format that can be physically stored in the configuration memory of the system to be downloaded to the reconfigurable hierarchical architecture and the microsequence memories. This step effectively comprises formatting the information after schedule and routing.

In some cases where hopping is used, congestion may occur at the CN used for the hop if it is overloaded. In this case a further hopping node is selected and a new physical connection created between the source and destination clusters to ease congestion.

Thus the hierarchical computer architecture described above is advantageous in that this architecture can be used instead of a hard designed device, and is reprogrammable after fabrication. Furthermore, the computing power of the device can be increased with very little design effort, by simply adding a higher level to the architecture.

The energy performance of the architecture is also improved. In a computing architecture, short distance connections require less energy than long distance connections. The hierarchical architecture described herein provides many short connections at the cluster level, and selectable connections at higher levels, thus allowing long distance connections to be reduced.

By providing input buffers 108, 110 in each computing node 100 of the hierarchical architecture, scheduling of data within the architecture is easier. Furthermore, by providing a direct route from the input buffers to the output port of each computing node, a computing node is able to act as a buffer alone, providing buffering of data to be provided to other computing nodes. This is particularly important to enable hopping, as this allows the output of a computing node to be output to a different cluster via a second computing node, without the data having to pass through the functional unit of the second computing node.

According to the embodiments described above, the compiler assigns subtasks to clusters such that intercluster connections are reduced. This is advantageous as these connections use a lot of hardware resources and consume a lot of energy. If instructions were placed so as to maximize parallelism between instructions, there would be many more intercluster connections.

Advantageously, the compilation method described above performs scheduling at the same time as fine routing, providing a further means of reducing connections between clusters by hopping, at the same time as ensuring that data dependencies are respected.

Whilst examples of a reconfigurable hierarchical architecture and methods of mapping tasks to the architecture have been described, it will be obvious that many variations are possible.

Each computing node has been described as including input buffers, and a functional unit which operates at word level, however in alternative embodiments these buffers could be capable of storing multiple words and the functional unit could operate at the level of a greater or lower number of bits. Likewise, although the scratch register file has been described as being able to store four words, this register could be larger or smaller in alternative embodiments. Furthermore, each computing node could include multiple processors, for example arranged in a parallel, or in a single pipeline. The number of input/output ports in each CN can be greater or less than the two described in the embodiments above. If more ports are provided, this will provide more resources for scheduling.

It is possible to provide the connectivity between the computing nodes of each cluster using the crossbar as described in relation to FIG. 2, which is equivalent to making these connections to an input multiplexer 120, 122 of each computing node as shown in FIG. 1. In alternative embodiments more input buffers could be provided, and each intercluster connection could be permanently connected to an input buffer of each computing node and one further buffer could be selectively connected to the external input lines 222. Furthermore, whilst one example has been provided for the design of the multiplexer block connecting other blocks, other designs are possible.

Whilst the mapping method described above uses a data flow graph as a starting point, many alternatives exist. For example, the task could be represented in C programming code, or alternative code. It is only necessary that the representation can be divided into groups of operations assignable to a cluster, and into operations executable by individual computing nodes.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended to be limiting. The invention is limited only as defined in the following claims and the equivalent thereto.

What is claimed is:

1. A reconfigurable hierarchical computer architecture having N levels, where N is an integer value greater than one, wherein said N levels comprise:
    a first level comprising a first computation block comprising a first data input, a first data output and a plurality of computing nodes interconnected by a first connecting means, each computing node comprising:
    an input port;
    a functional unit; and
    an output port;
    the first connecting means configured to interconnect the plurality of computing nodes, wherein each computing node of the plurality of computing nodes further comprises an instruction memory configured to dynamically control the first connecting means during execution of instructions; and
    a second level comprising a second computation block comprising:
    a second data input;
    a second data output; and
    a plurality of said first computation blocks interconnected by a second connecting means for connecting a selected one of said first data output of each of said first computation blocks and said second data input to each of said first data inputs and for connecting a selected one of said first data outputs to said second data output.

2. The reconfigurable computer architecture of claim 1, wherein said first connecting means provides a time multiplexed connection, and wherein said second connecting means provides a static connection.

3. The reconfigurable computer architecture of claim 1, further comprising further levels, each nth level, where n is equal to each integer value from 3 to N, comprising an nth computation block comprising:
    an nth data input;
    an nth data output; and
    a plurality of (n−1)th computation blocks each comprising an (n−1)th data input and an (n−1)th data output, said (n−1)th computation blocks interconnected by an nth connecting means for connecting a selected one of said (n−1)th data output of each of said (n−1)th computing nodes and the nth data input to each of said (n−1)th data inputs, and for connecting a selected one of said (n−1)th data outputs to the nth data output.

4. The reconfigurable hierarchical computer architecture of claim 1, wherein each computing node further comprises at least one input buffer connected to said input port.

5. The reconfigurable hierarchical computer architecture of claim 4, wherein said at least one input buffer is connectable directly to said output port of each computing node.

6. The reconfigurable hierarchical computer architecture of claim 1, wherein each computing node further comprises at least one register file for storing an output from said functional unit.

7. The reconfigurable hierarchical computer architecture of claim 1, wherein said architecture is a radix r architecture, r being an integer value greater than one, wherein said second computation block comprises r first computation blocks, and said nth computation block comprises r (n−1)th computation blocks.

8. The reconfigurable hierarchical computer architecture of claim 7, wherein r is equal to 4.

9. The reconfigurable hierarchical computer architecture claim 1, wherein said second connecting means is a multiplexer arranged to be statically programmed in a boot phase of said computer architecture.

10. The reconfigurable hierarchical computer architecture claim 1, wherein said first connecting means comprises a crossbar.

11. The reconfigurable hierarchical computer architecture of claim 1, wherein said first connecting means comprises an input multiplexer associated with said input port of each computing node for receiving said data output of each other computing node of the plurality of computing nodes, and for receiving the data output of said second computation block.

12. The reconfigurable hierarchical computer architecture of claim 1, wherein a first computing node of a first one of said first computation blocks is connected to a second computing node of a second one of said first computation blocks via a third computing node of said first one of said first computation blocks.

13. The reconfigurable hierarchical computer architecture of claim 1, wherein each of said computing nodes receives a common clock signal such that they operate synchronously with each other.

14. A portable media device comprising at least one reconfigurable hierarchical computer architecture having N levels, where N is an integer value greater than one, wherein said N levels comprise:
   a first level comprising a first computation block comprising a first data input, a first data output and a plurality of computing nodes interconnected by a first connecting means, each computing node comprising:
   an input port;
   a functional unit; and
   an output port;
   the first connecting means configured to interconnect the plurality of computing nodes, wherein each computing node of the plurality of computing nodes further comprises an instruction memory configured to dynamically control the first connecting means during execution of instructions; and
   a second level comprising a second computation block comprising:
   a second data input;
   a second data output; and
   a plurality of said first computation blocks interconnected by a second connecting means for connecting a selected one of said first data output of each of said first computation blocks and said second data input to each of said first data inputs and for connecting a selected one of said first data outputs to said second data output.

15. A method of mapping a required task onto the physical resources of a reconfigurable hierarchical computer architecture having N levels, where N is an integer value greater than one, a first level comprising a cluster comprising a plurality of interconnected computing nodes each comprising a functional unit, and a second level comprising an interconnected plurality of said clusters, said method comprising:
   partitioning said task into subtasks each comprising a plurality of operations;
   assigning each of said subtasks to one of said clusters;
   assigning the operations of each subtask to the computing nodes in each cluster; and
   scheduling the operations in the computing nodes and performing fine routing between computing nodes, wherein said step of scheduling the operations and performing fine routing comprises reducing a number of connections between clusters by providing a connection between a first computing node in a first cluster and a second computing node in a second cluster via a third computing node in said first cluster.

16. The method of claim 15, further comprising, after the step of assigning each of said subtasks to one of said clusters, the steps of:
   performing routing between clusters.

17. The method of claim 16, wherein if routing between clusters is unsuccessful, comprising the further step of increasing the physical resources of said reconfigurable hierarchical architecture and performing again said partitioning step.

18. The method of claim 15, wherein said step of scheduling said operations in the computing nodes comprises scheduling, with respect to a clock signal, each operation to be performed by said functional unit of each computing node, and assigning a time slot defined by said clock signal to each data transfer between computing nodes.

19. A method of mapping a required task onto the physical resources of a hierarchical reconfigurable computer architecture having N levels, where N is an integer value greater than one, a first level comprising a cluster comprising a plurality of interconnected computing nodes, and a second level comprising a plurality of interconnected clusters, said method comprising:
   determining that a new connection is required between a first computing node in a first cluster and a second computing node in a second cluster;
   determining whether a connection already exists between a third computing node in said first cluster and said second cluster;
   if said connection already exists connecting said first computing node to said second computing node via said third computing node; and
   if no connection exists between said third computing node and said second cluster, creating a connection between said first computing node and said second computing node, and connecting at least one other computing node of said first cluster to said second cluster via said first computing node.

20. A reconfigurable hierarchical computer architecture comprising:
   in a first level of the hierarchical architecture, at least two computing nodes interconnected by a first level connection device to form a cluster, each computing node comprising at least one input port, a functional unit and an output port; and in a second level of the hierarchical architecture, at least two clusters interconnected by a second level connection device to form a computing sub-block, each cluster having an input port and an output port, wherein each computing node further comprises:
an input buffer associated with the at least one input port;
a register file configured to receive an output of the functional unit;
a selector configured to receive inputs from the input buffer and the register file and to supply data to the functional unit and to the output port; and
an instruction memory configured to control the input buffer, the register file and the selector.

21. A reconfigurable hierarchical computer architecture as defined in claim 20, further comprising, in a third level of the hierarchical architecture, at least two computing sub-blocks interconnected by a third level connection device to form a computing block, each computing sub-block having an input port and an output port.

22. A reconfigurable hierarchical computer architecture as defined in claim 20, wherein the first level connection device comprises a crossbar that is dynamically controlled during program execution.

23. A reconfigurable hierarchical computer architecture as defined in claim 22, wherein the second connection device comprises a multiplexer that is statically programmed in an initial phase of operation.

24. A reconfigurable hierarchical computer architecture comprising:
in a first level of the hierarchical architecture, at least two computing nodes interconnected by a first level connection device to form a cluster, each computing node comprising at least one input port, a functional unit and an output port; and
in a second level of the hierarchical architecture, at least two clusters interconnected by a second level connection device to form a computing sub-block, each cluster having an input port and an output port, wherein the first level connection device comprises a crossbar that is dynamically controlled during program execution and wherein each computing node further comprises an instruction memory configured to control the crossbar.

25. A reconfigurable hierarchical computer architecture as defined in claim 20, wherein the first level connection device comprises an input multiplexer associated with the input port of each computing node.

26. A reconfigurable hierarchical computer architecture comprising:
in a first level of the hierarchical architecture, at least two computing nodes interconnected by a first level connection device to form a cluster, each computing node comprising at least one input port, a functional unit and an output port; and
in a second level of the hierarchical architecture, at least two clusters interconnected by a second level connection device to form a computing sub-block, each cluster having an input port and an output port, wherein the first level connection device comprises an input multiplexer associated with the input port of each computing node and wherein each computing node further comprises an instruction memory configured to control the input multiplexer associated with the computing node.

27. A reconfigurable hierarchical computer architecture as defined in claim 20, wherein each computing node further comprises at least one input buffer connected to the at least one input port.

28. A reconfigurable hierarchical computer architecture as defined in claim 27, wherein the at least one input buffer is connectable directly to the output port of the associated computing node.

29. A reconfigurable hierarchical computer architecture as defined in claim 20, wherein each computing node further comprises at least one register file configured to store an output from the functional unit.

30. A reconfigurable hierarchical computer architecture as defined in claim 20, wherein a first computing node of a first cluster is connected to a second computing node of a second cluster via a third computing node of the first cluster.

31. A reconfigurable hierarchical computer architecture as defined in claim 20, wherein the instruction memory is further configured to control the first level connection device.

* * * * *